United States Patent
Babayan et al.

(10) Patent No.: US 6,875,473 B2
(45) Date of Patent: Apr. 5, 2005

(54) WOVEN FABRIC WITH A MODIFIED ESTER RESIN FOR USE AS A WET FRICTION LINER

(75) Inventors: Eduard P. Babayan, Huntington Beach, CA (US); Michael C. Burkitt, Costa Mesa, CA (US); David W. Gibson, Newport Beach, CA (US)

(73) Assignee: J. D. Lincoln, Inc., Costa Mesa, CA (US)

( * ) Notice: Subject to any disclaimer, the term of this patent is extended or adjusted under 35 U.S.C. 154(b) by 40 days.

(21) Appl. No.: 10/025,348

(22) Filed: Dec. 19, 2001

(65) Prior Publication Data

US 2004/0213980 A1 Oct. 28, 2004

Related U.S. Application Data

(60) Provisional application No. 60/260,331, filed on Jan. 8, 2001.

(51) Int. Cl.$^7$ ................................. B05D 1/18
(52) U.S. Cl. ...................... 427/434.6; 28/140; 156/435; 264/643; 427/249.3
(58) Field of Search ................................ 428/343, 365, 428/367, 375; 427/434.6, 249.3; 156/435; 264/643; 28/140

(56) References Cited

U.S. PATENT DOCUMENTS

| | | | | |
|---|---|---|---|---|
| 4,919,739 A | * | 4/1990 | Dyksterhouse et al. |
| 4,997,067 A | * | 3/1991 | Watts |
| 5,662,993 A | * | 9/1997 | Winckler |
| 5,670,231 A | * | 9/1997 | Ohya et al. |
| 5,842,551 A | * | 12/1998 | Nels |
| 6,139,942 A | * | 10/2000 | Hartness et al. |

* cited by examiner

*Primary Examiner*—Archene Turner
(74) *Attorney, Agent, or Firm*—Willie Krawitz

(57) ABSTRACT

Woven fabric of continuous, untwisted carbon yarn is impregnated with a modified cyanate ester resin or oligomer, preferably at least about 10% by weight of the combined weight of the cured resin and fabric. The cured fabric may be employed as a wet friction material suitable for use in transmission fluid couplings, and the like. The cured composite sheet can be backed with an adhesive film or liquid bonding paste for ease of bonding to one side of the metal portion of the transmission or clutch. Where thicker material is required, two or more cured composite sheets can be bonded together for applications such as transmissions.

1 Claim, No Drawings

WOVEN FABRIC WITH A MODIFIED ESTER RESIN FOR USE AS A WET FRICTION LINER

This application claims benefit of Provisional No. 60/260,331 filed Jan. 8, 2001.

BACKGROUND OF THE INVENTION

This invention relates to a new and improved resin-impregnated fabric, which upon curing, is suitable for use as a wet friction material in transmission couplings, automatic lockers, limited slip differentials, smart clutches, brakes, synchronizers and the like. More particularly this invention concerns the use of woven or braided fabric utilizing continuous untwisted carbon filament yarn or other fiber, and impregnating this material with a modified cyanate ester oligomer at low concentration levels for such use after curing.

The use of woven fabrics containing different resins such as phenolics, pyrolytic carbon, epoxy, etc., are well known in the industry and have been used for many years in the aerospace and automotive industries.

Also, the use of resin-impregnated fabric cured composites as wet friction materials in transmission and brake components is well known, and typical publications concerning this use are disclosed in U.S. Pat. Nos. 4,700,823; 5,662,993; 5,842,551; 5,895,716; 5,952,249; 6,060,536; 6,132,877 and, 6,135,256. In wet friction applications, the flow of hydraulic fluid and the hydrodynamic film formed between the driven and non-driven member of the transmission play an important role in providing effective performance as transmission couplings.

The materials described in these patents may have various problems associated with their use. For example, in the case of U.S. Pat. No. 5,662,993 to Winckler there is a problem with the type of fabric employed, which is woven with bundles of twisted, stretch-broken filaments. The problem arises since the loose strand ends described in those patents can become worn due to abrasion. Eventually these loose ends may tend to break off, causing contamination due to the formation of debris within the fabric which then becomes plugged; this debris tends to interfere with oil circulation.

Moreover, since the fabric material used in the Winckler patents is bulky, this bulkiness requires a fairly large amount of phenolic (or other) resin to be employed for effectiveness.

Also in the Winckler patent, the twisted bundles of discontinuous staple fibers in the fabric are made by stretch breaking, twisting and spinning, which is similar to cotton yarn production. However, this process of carbon staple yarn production is expensive. In addition, since the lengths of these discontinuous filaments can be in the range of about ¼"–4", the fabric formed from this fuzzy type of yarn does not produce the same strength as fabric formed from continuous, untwisted filament strands.

Phenolic resins have been in use for many years because their high cross linking density and high aromatic ring content results in a high glass transition temperature and a high char yield. However, because of their high cross linking density, phenolic resins tend to be more brittle and resemble crystalline materials which have poor adhesion to carbon fibers. Also, during the phenolic curing stage, some reaction by products are emitted which cause porosity and bulkiness.

THE INVENTION

According to the invention, there is provided wet friction cured composite materials for use in torque converters such as transmission couplings, locking differentials, automatic lockers, limited slip differentials, smart clutches, synchronizers, brakes, and the like. The cured, composite materials comprise a modified cyanate ester oligomer impregnated fabric formed from a woven or braided fabric from continuous, untwisted filament yarn.

Modified cyanate ester oligomers are preferred because of their unique cross linking and triazine ring formation which impart high glass transition temperatures and also function more like polymeric matrices with improved toughness and good adhesion to the carbon fiber.

Typical fabric materials include those woven from carbon, graphite, ceramics such as NEXTEL$_R$ (3M), aramid fiber, glass, quartz, silica, and mixtures thereof, and typical fabric weaves include plain, braided, 5 and 8 harness satin, basket, twill, crowfoot satin, or other suitable weaves. When used as a braided weave, the fabric can be formed as a continuous spiral, cut to size, and bonded to the transmission in one piece, rather than being bonded in segments as joints or discs cut from the fabric which are now being manufactured.

Preferred modified cyanate ester oligomers include multifunctional cyanate ester modified phenolic novolac resins sold by Lonza under the trade names of PT-15, PT-30 and PT-60.

Other possible modified cyanate ester resin types and oligomers are disclosed in the textbook entitled: "CHEMISTRY AND TECHNOLOGY OF CYANATE ESTER RESINS", edited by I. Hammerton, published by Blackie Academic and Professional, 1994, and which is incorporated herein by reference. Typical cyanate resin monomers which may be considered for use in the fabric material of this invention are listed in that text on pages 3, 35, 38, 39, 40, 41, 42, 44, and 47–52, incorporated herein, by reference.

Specific resins are selected based on a suitable combination of characteristics for transmission coupling requirements (but not limited thereto) such as high temperature performance, abrasion resistance, toughness and fabric compatibility.

However, while a wide variety of fabric materials are also disclosed in that text, the possible combination of fabric, cyanate resin and resin weight, is not disclosed or inferred as a wet fabric material suitable for transmission coupling purposes. For example, pages 325–326, 331, and 343 of that text give no indication that a combination of fabric, cyanate resin and resin weight could be employed for transmission coupling purposes.

The resin content in the cured fabric is estimated at least about 10% based on the cured weight of the resin and fabric, and may vary up to at least 40%–50% for certain unique specific applications. Suitable resin content weights may include 10%–35%; and, 10%–25%. The preferred resin weights are about 10%–18%, and most preferably about 12%–17% of the cured weight of the resin and fabric combined for some automotive and truck applications. This considerably lowers the resin content in the fabric compared to the prior art.

Following impregnation of the fabric using a mixture of resin in a suitable solvent such as ketones, esters (e.g., acetates), ethers, or miscellaneous solvents such as methylene chloride, dimethyl acetamide, monochlorobenzene, propylene carbonate, etc., the fabric is then cured. The cured composite is then coated with a slightly tacky adhesive film backed with a release paper, or the cured composite may be simply coated with an adhesive for direct application to a metal surface. Alternatively, the cured composite may be supplied without any surface adhesive coating, and the coating is applied at the transmission installation site.

When it is desired to install the impregnated and cured fabric material onto a transmission component, a primer is applied to the metal surface, and the fabric is placed with its adhesive side onto the surface of the transmission component. This combination is then heated under compression for about 3–13 minutes, or as commercial efficiency times dictate, thereby further curing the cyanate resin, and at the same time bonding the fabric to the transmission component. This process also produces a suitable thickness of the cured fabric.

The cured fabric thickness can vary widely such as from 0.015–0.080 inches; and typically may vary from about 0.020–0.030 inches, and preferably from about 0.024–0.028 inches. If desired, two or more cured fabric layers may be adhesively bonded together to produce a greater thickness. The number of ends in the filament yarn may vary from about 1000–24,000, and typically are about 6,000.

Bonding of two carbon fabric layers together was accomplished by applying a primer layer to an adhesive film between two layers of fabric which were then heated in a press at 425° F. and 100 psi for six minutes. After cooling, the material of the two layers was well bonded together, and the outer sides had the same texture as a single layer material.

In a second experiment, a primer was painted onto a thin fiberglass matt (about 1 mil) and this matt and adhesive film were placed between two cured carbon fabric layers and then bonded under the same conditions, as previously noted. The thickness of the single layer was 0.024–0.028 inches, and that of the two layers bonded together was 0.048–0.054 inches. Other techniques for bonding the two layer of cured fabric could be used.

Phenolic resins due to low cost, flame resistance and high glass transition temperatures have a long history of use in the composite industry. However, it is well known that their adhesion and shear strength on carbon fiber is fairly low. To illustrate this point a cured swatch of stretch broken twisted carbon fabric impregnated with a phenolic resin such as Aerofene 295 available from Ashland Chemicals was compared with the same cured fabric with a cyanate ester oligomer based swatch of Pt-30 available from Lonza Chemicals.

EXAMPLE 1

A solution of a phenolic resin (Aerofene 295 obtained from Ashland Chemical) was further diluted with isopropanol, and the resulting solution was used to prepreg a swatch of plain weave stretch broken twisted yarn carbon fabric. Following devolatizing, the prepreg material was cured.

EXAMPLE 2

To an acetone solution of a polycyanate of a novolac phenol resin (PT-30) there was added 2 grams of copper acetyl acetonate in nonyl phenol. The resulting solution was used to impregnate a 12×12 swatch of the fabric described in Example 1. After devolatizing to achieve cross linking, the prepreg was oven cured for two (2) hours at 350° F. followed by a post cure at 425° F. and 550° F.

A simple test was performed by rubbing an eraser over both the cured fabrics of examples 1 and 2 for comparison purposes, and it was found that more broken filaments were produced from example 1, compared to example 2. This would suggest that cyanate resins will have less contamination problems when used for transmission purposes, and also that the cyanate ester-based cured material seemed to have better adhesion to the stretch-broken plain weave carbon fabric compared to the phenolic resin.

While unmodified cyanate ester polymers are generally tougher than unmodified phenolic resins, with proper modification the toughness of cyanate resins can be improved without sacrificing temperature performance. For example, it has been well documented that adding certain thermoplastics to cyanate ester resins will increase the matrix toughness without adversely affecting the modulus or the glass transition temperature. Several thermoplastics which are compatible with poly-m-methyl-phenylene cyanate oligomers and other cyanate esters include polyether sulfone; polyphenylene oxides; polycarbonates; epoxy thermoplastics; and, polyimide polymers.

Cyanate ester oligomers modified with silicone based reactive or non-reactive elastomers may be particularly useful in order to achieve abrasion resistance and lower friction properties. These silicones include products such as polydimethyl silsesquioxane alkyl polyethoxy ethanol (Additive 23), alkoxy polyethoxy ethanol and, dimethyl silicone resin (Additive 22); and General Electric's dimethyl polysiloxane with methylsilsesquioxanes (TPR 179), polydimethyl siloxane (TPR 178) with methylsilsesquioxanes silicone resins, and other methyl phenyl silicone resins.

Modified cyanate ester resin and oligomers may include polycyanate resins modified with: epoxy resins; silicone elastomers; polycyanate resins modified with polyetherimide resins; polycyanate resins modified with polyphenoxy resins; and, polycyanate resins modified with: diglycidyl ethers of a novolac resin, and a polyglycidyl ether of a cresol novolac resin.

The following examples 3–6 utilize a continuous filament, carbon plain weave fabric where each bundle contains about 6,000 continuous carbon filaments.

EXAMPLE 3

A solution of a thermoplastic polyetherimide (ULTEM$^R$ sold by General Electric) having a glass transition of 420° F., was dissolved in methylene chloride and used to prepreg a swatch of carbon fabric. Following devolatizing and curing, the carbon fabric exhibited an increase in toughness. However, the glass transition temperature of the product was too low to enable its use as a transmission coupling.

It will be appreciated that while transmission temperatures during normal operation are about 200° F.–250° F., when the non-driven member engages the driven member of the converter, the surface temperature of the facing material can spike for a fraction of a second to several hundred degrees Fahrenheit. These temperature spikes, require the matrix of the carbon based surfacing material to have a high glass transition temperature capability and toughness, and suitable matrices are given below.

While the use of some thermoplastics may be a viable choice, their glass transition temperatures are generally too low. By combining some of these thermoplastics with a cyanate ester resin or oligomer, an improvement in both the glass transition temperature and toughness of the matrix can be achieved, and this improvement is shown in example 4.

EXAMPLE 4

To one part of a solution of ULTEM$^R$ (example 3), and ten parts P-30 (example 2), there was added a copper acetyl acetonate catalyst. This solution was used to prepreg a swatch of carbon fabric, followed by devolatizing and curing the prepreg, as in example 2. This product resulted in both the glass transition temperature and toughness being improved.

While adding a polycyanate ester oligomer such as Pt-30 in conjunction with ULTEM in methylene chloride will solve the glass transition temperature problem and have the needed toughness, the use of chlorinated solvents makes this approach commercially less desirable.

EXAMPLE 5

A solution of {phenol, 4,4'-(1-methylethylidine) bispolymer and (chlormethyl oxirane) phenoxy resin}—PKHH from Phenoxy Associates, was prepared in MEK. To 20 parts of this solution was added 80 parts of a solution of PT-30 (example 2), and a copper catalyst.

The combined solution was used to prepreg a swatch of carbon fabric and cured as in example 2. Actual road tests of transmissions employing continuous carbon fiber fabric with the resulting modified cyanate esters having resin contents ranging from 12%–17% confirmed the excellent performance of these materials.

Another acceptable approach utilizes a mixture of Pt-30 cyanate ester oligomer in combination with diglycidyl ether of a novolac resin such as ECN-1280, from Vantico Corp., at a ratio of 60:20:20. Prepared on untwisted continuous filament carbon fabric or glass or Nextel$^R$ (a ceramic-based fabric), also gave an acceptable product from the standpoint of toughness and glass transition temperature.

EXAMPLE 6

To sixty grams of PT-30 (example 2) dissolved in acetone there was added 20 grams of a diglycidyl ether of a novolac resin (PY-307 from Vantico, Inc.) and 20 grams of a polyglycidyl ether of a cresol novolac (ECN-1280 from Vantico, Inc.). The solution was catalyzed with copper acetyl acetonate and used to prepreg a carbon fabric. Following devolatizing, the prepreg was cured in a similar fashion as in example 2. This prepreg solution was also used to prepreg glass and Nextel$^R$ (a ceramic based fabric) for comparison and evaluation.

As can be seen in the above examples, there are numerous possibilities for formulating suitable cyanate resin and oligomer systems. Cyanate ester oligomers are surprisingly suitable since their glass transition temperatures can be as high as 690° F., and the glass transitions do not change drastically even after substantial modification with epoxy resins or other thermoplastics. Also, triazine polymers are inherently tougher than phenolic resins.

Moreover, surprisingly low resin contents of about 10% are estimated sufficient to fully encapsulate a plain weave fabric woven with continuous carbon filaments and yet maintain the toughness and integrity of the surfacing material. Typically, the very simple empirical eraser test described in example 2 on a low resin content of toughened cyanate ester cured facing sheet materials will show no broken filaments. Generally, actual road tests of transmissions employing material employing cyanate ester resins confirmed the superior performance of these materials.

Various adhesive formulations for bonding the cured composite to transmissions were evaluated and considered useful, as shown in Table 1. The key requirements for adhesive films at short bonding cycles of 400° F.–450° F. are their capability for use at high temperatures, compatibility with friction fluids, and toughness. Modified cyanate ester resin or oligomers were found surprisingly effective for such bonding applications due to fast cure capability and lower emissions of volatized components.

TABLE 1

| TRIALS | 1. | 2. | 3. | 4. | 5. | 6. | 7. | 8. | 9. | 10. | 11. | 12. | 13. |
|---|---|---|---|---|---|---|---|---|---|---|---|---|---|
| | | | | | WEIGHT BASED RATIOS | | | | | | | | |
| CATALYST | 1.85 | 0.15 | 1.5 | 1.75 | 2 | 2 | 2 | 2 | 2 | 0.15 | 0.15 | 1.5 | 1.5 |
| NBR-1411 | 3 | | | | | 3 | 3 | | | | | | |
| BUTVAR | 18 | | 28.5 | 10 | 10 | | | | | | | | |
| B-10 | | | | | | | | | | 30 | | | |
| M-30 | 35 | 30 | 35 | | | | | | | | | 30 | 30 |
| PKHH | | 28.5 | | 20 | 20 | 38 | 38 | 28 | 28 | 39 | 39 | 34.5 | 32.7 |
| MAT GLASS | | | | | | | | G | G | | | | |
| EXL 2891 | 12 | 10 | | | | | | | | 4 | 4 | 3.5 | 3.5 |
| M-10 | | | | 35 | | | | | 40 | | | | |
| PT-30 | | | | | 30 | 30 | 30 | 35 | | | 30 | | |
| PY-307 | 30 | 30 | 35 | 35 | 30 | 30 | 30 | 35 | 37 | 30 | 30 | 30 | 28 |
| AREOSIL | | | | | | | | | 3 | 4 | | | |
| LAP SHEAR (KSI) | 2140 | 2765 | 2310 | 2200 | 2475 | 1930 | 2495 | 1975 | 2170 | 2735 | 2515 | 1896 | 1775 |

AEROSIL: amorphous, fumed silica - Degussa Corp.
B-10: bisphenol A dicyanate - Lonza Corp.
M-10, M-30: methylene bis-(3,5-dimethylphenyl-cyanate) - Lonza Corp.
NBR-1411: acrylonitrile-butadiene copolymer - Zeon Chemical Inc.
PT-30: polycyanate ester of novolac phenol - Lonza Corp.
PY-307: diglycidyl of novolac phenol - Vantico Inc.
PKHH: {phenol 4,4'-(1-methylethylidene) bispolymer with (chlormethyl) oxirane} (Phenoxy Associates).
BUTVAR: polyvinyl butyral.
CATALYST: Cu acetyl acetonate in nonyl phenol.
EXL 2891: high molecular weight butadiene/acrylonitrile/styrene - Rohm & Haas.

What is claimed is:

1. A method of forming a composite suitable for use as a wet friction material coupling in applications selected from the class consisting of transmission couplings, automatic lockers, limited slip differentials, smart clutches, synchronizers, brakes, and the like, consisting of: impregnating a woven fabric with a modified cyanate ester or oligomers thereof, the fabric being formed from a continuous, untwisted carbon or graphite filament yarn having about an end count of 3,000–12,000, the modified cyanate ester resin or oligomer as cured in the fabric being about 10%–50% by weight of the fabric and cured resin, and the composite thickness being about 0.015–0.080 inches, the impregnated fabric being manufactured and constructed as a surface bonding for use on the coupling.

* * * * *